United States Patent Office 3,399,263
Patented Aug. 27, 1968

3,399,263
STABLE ADJUVANT EMULSION COMPOSITIONS COMPRISING THE HYDRATED REACTION PRODUCTS OF A METALLIC CATION AND A FATTY ACID
Edward Strazdins, Stamford, and Richard Lansing Webb, Darien, Conn., assignors to American Cyanamid Company, Stamford, Conn., a corporation of Maine
No Drawing. Filed Apr. 12, 1965, Ser. No. 447,558
7 Claims. (Cl. 424—88)

ABSTRACT OF THE DISCLOSURE

The novel composition herein disclosed relates to an adjuvant composition comprising a disperse aqueous phase containing an antigenic substance and a continuous oil phase, said composition having admixed therein at least 0.5% by volume of the hydrated reaction products of a physiologically acceptable metallic cation and a physiologically acceptable fatty acid having 12 to 24 carbon atoms. Furthermore, a bimultiple emulsion adjuvant composition is disclosed, as well as a method of employing both compositions to potentiate the antigen-antibody effect in a host.

---

Generally stated, the subject matter of the present invention relates to an adjuvant composition. More particularly, the invention relates to an adjuvant composition which when parenterally administered with an antigenic substance results in the production of higher antibody titres than the administration of an equivalent dose of the antigenic substance.

It is a fact well recognized in the art that higher antibody titres can be achieved by a series of small injections of a given antigenic substance, than by a single injection of a quantity of said substance which is equivalent to the total of the small injections. Researchers have attempted to achieve high antibody titres by the single dose administration of an antigenic substance, rather than the administration of a number of small doses, proposing the administration of a single dose which would be gradually released into the system of a host at a rate, such that is as effective in producing as high an antibody titre as a series of small doses. The substance or medium used to achieve this gradual release or depot effect is generally referred to as an adjuvant, which is defined as a material which is administered with and enhances the action of a drug, or antigenic substance.

Particular adjuvants have been employed with particular antigenic substances, however, the availability of an adjuvant system which would enable the potentiation of the antigen-antibody effect of antigenic substances generally, has for the most part been unavailable. Substances such as alum, tapioca, tannin and the like, have been employed with antigenic substances, and although successful potentiation of the antigen-antibody effect was achieved with a particular antigenic substance, the same effect could not be duplicated with antigenic substances generally.

The first significant development in the adjuvant area related to the Freund adjuvant which was employed to achieve a potentiation of the antigenic substances generally. Freund discovered that a water-in-oil emulsion comprising mineral oil, *Mycobacterium tuberculosis*, and an antigen in the disperse aqueous phase, emulsified by a suitable emulsifying agent, was capable of achieving potentiation of the antigen-antibody effect. In addition to the foregoing composition, the incomplete Freund adjuvant, that is without the *Mycobacterium tuberculosis*, and utilizing mannide monooleate, was also capable of achieving the potentiation of the antigen-antibody effect of antigenic substances generally. However, the non-metabolizable character of mineral oil with the attendant disadvantages inherent thereto, as well as the possible implication of mannide monooleate as a carcinogen has resulted in the diminished use of the Freund adjuvant. A patent has recently issued, in particular U.S. Patent No. 3,149,036, Woodhour et al., which discloses an apparent duplication of the results achieved by the Freund adjuvant by utilizing an adjuvant composition comprising a vegetable oil instead of mineral oil, however, the composition requires utilization of mannide monooleate as an emulsifying agent.

The present invention represents the culmination of a long series of investigations conducted largely by the inventors and their associates in the development of a general adjuvant system. The inventive concept upon which the present invention is based resides in the discovery of an effective three-component adjuvant system comprising a disperse aqueous phase and a continuous oil phase, said system having admixed therein the hydrated reaction products of a physiologically acceptable polyvalent metallic cation and a physiologically acceptable fatty acid containing 12 to 24 carbon atoms.

Therefore, the invention relates to an adjuvant composition comprising a disperse aqueous phase containing an antigenic substance, and a continuous oil phase, said composition having admixed therein at least 0.15 percent by volume of the hydrated reaction products of a physiologically acceptable polyvalent metallic cation and a physiologically acceptable fatty acid having 12 to 24 carbon atoms.

In addition, the invention relates to a method of potentiating the antigen-antibody effect in a host which comprises the administration of a sufficient quantity of a composition comprising a disperse aqueous phase containing an antigenic substance and a continuous oil phase, said composition having admixed therein at least 0.15 percent by volume of the hydrated reaction products of a physiologically acceptable metallic cation and a physiologically acceptable fatty acid containing 12 to 24 carbon atoms.

The advantages which inure to the art as a consequence to the advent of the present invention should be readily apparent from the foregoing. Primarily, the necessity of administering a series of small doses at frequent intervals to achieve higher antibody titres has for the most part been obviated by the present invention, since the administration of the novel adjuvant composition of the present invention results in a potentiation of the antigen-antibody effect in a host. Therefore, the novel adjuvant composition of the present invention enables the administration of a quantity of antigenic substance, which is gradually released into the system of the host and thereby achieves a higher antibody titre. Lastly, an adjuvant composition which does not require the use of mannide monooleate has been made available for the potentiation of the antigen-antibody effect of antigenic substances generally.

The present invention is, therefore, applicable to antigenic substances generally, which are incorporated in the aqueous phase prior to emulsification, and as may be the case with particular antigenic substances the aqueous medium of the antigenic substance as available may constitute the aqueous phase. The aqueous phase may also contain in addition to the antigenic substance, preservatives, as well as those materials which are conventionally employed with an antigenic substance. The antigenic substance is used either in a purified or concentrated form, also it can be added in any desired aqueous medium such as in the form of a vaccine in which it is normally administered, or dissolved in a balanced salt solution, physiological saline solution, phosphate-buffered saline solution, and tissue culture media among others, or media in which an organism may have been grown such as embryonated egg amniotic, allantoic, or yolk sac material and the like.

The antigenic substance employed in the novel adjuvant composition of the present invention may be defined as, that substance derived from the culture of a microorganism which substance when introduced into the system of a host gives rise to antibodies serving to protect against or combat infection, and shall also be defined to include allergenic substances, as well as those poisons or venoms derived from poisonous insects or reptiles. Illustrative of substances which fall within the first category are *H. pertussis, S. typhosa, C. tetani, V. cholerae,* measles, mumps, hog cholera, Newcastle disease virus, and canine distemper among others. With regard to allergenic substances, which are defined as those agents capable of producing a state or manifestation of allergy, illustrative of the substances which fall within this category are allergens, such as pollens, dust, danders, or extracts of the same and may include such allergens as ragweed, house dust, pollen extracts, grass pollens and the like. Lastly, with regard to the antigenic substances which fall within the category of poisons or venoms of insects or reptiles, illustrative of such antigens are the poisons of bees and wasps among others, as well as cobra venom solution and antivenins such as those of the scorpion and *Lactrodectus mactans.*

The oils employed as the continuous oil phase must meet the necessary criteria of being physiologically acceptable as an injectable and will include those oils which satisfy the specifications of the United States Pharmacopeia or National Formulary. Illustrative of the oils which fall within this category are peanut oil, safflower oil, soya bean oil, cottonseed oil, light mineral oil, chaulmoogra oil, corn oil, olive oil, sesame oil, and coconut oil among others.

As employed in the novel adjuvant composition of the present invention, the physiologically acceptable polyvalent metallic cations may be defined as, those metals which form poorly soluble or insoluble hydroxides and are effective in terms of forming a salt with a fatty acid, and simultaneously undergoing lateral association through a hydrogen bonding of the hydroxyl groups. Typical of the metals which fall within this category are aluminum, magnesium, iron, cerium, zinc, copper, lanthanum, bismuth, and manganese among others. Lastly, the physiologically acceptable fatty acids employed in the present invention may be defined as a group of organic, monobasic saturated or unsaturated acids derived from the hydrocarbons by the equivalent of an oxidation of a methyl group, and as utilized in the present invention may contain 12 to 24 carbon atoms. Typical of the fatty acids which fall within this category are lauric, myristic, palmitic, stearic, arachidic, behenic, lignoceric, ricinoleic, oleic, erucic, linoleic and the like.

It is preferred to use either the freshly prepared hydrated reaction products of the physiologically acceptable polyvalent metallic cation and a physiologically acceptable fatty acid containing 12 to 24 carbon atoms, or the hydrated reaction products which have been prepared in situ. The novel adjuvant composition of the present invention may be prepared in the following manner: the metallic cation in the form of its insoluble hydroxide may be suspended in a fine state of subdivision in the aqueous medium, this suspension is then added with mechanical agitation to a solution of the fatty acid in oil. As a more convenient alternative the aqueous phase can be prepared by dissolving a water-soluble salt of the cation such as the chloride, nitrate or sulfate in the aqueous medium, adjusting the pH to the desired range with a base such as sodium hydroxide, thus precipitating the metallic hydroxide in a finely divided form. The antigenic substance is then added to the suspension which is subsequently emulsified with the fatty acid oil mixture.

The process used in emulsification is conventionally conducted in a Waring Blendor, however, any mechanical stirring or agitating devices may be used. When a Waring Blendor is used, the oil phase is first added to the vessel and stirred while the aqueous phase is added in a dropwise fashion. Once all of the aqueous phase has been added, stirring is continued until the desired distribution of droplet sizes is obtained. Other emulsificating devices such as colloid mills, ultrasonic transducers and the like, may also be employed.

An effective adjuvant composition may be achieved by utilizing at least 0.15 percent by volume of the hydrated reaction products of a physiologically acceptable polyvalent metallic cation and a physiologically acceptable fatty acid containing 12 to 24 carbon atoms. However, the upper limitations of the concentration of said hydrated reaction products which may be utilized are dependent on a variety of factors, namely the relative concentrations of the oil phase and aqueous phase, the ease with which certain oils emulsify, the viscosity of the emulsion, and the like. The concentration may, therefore, be generally expressed as being at least 0.15 percent by volume of the hydrated reaction products of a physiologically acceptable polyvalent metallic cation and a physiologically acceptable fatty acid containing 12 to 24 carbon atoms.

A preferred adjuvant composition illustrative of the present invention would, therefore, contain 50 percent by volume of peanut oil, 1 percent by volume of the hydrated reaction products of aluminum and stearic acid in the molar ratio of aluminum to stearic acid of 1:2, and a sufficient quantity of the aqueous phase to bring the volume to 100 percent.

The following examples are provided for illustrative purposes and may include particular features of the invention, however, the examples should not be construed as limiting the invention, many variations of which are possible without departing from the spirit or scope thereof.

EXAMPLE 1

Utilization of the inventive concept in preparing an adjuvant composition

This example demonstrates a stable adjuvant composition in which the hydrated reaction products were formed in situ.

A composition consisting of the following ingredients was prepared:

| | Percent by vol. |
|---|---|
| Peanut oil | 49 |
| Stearic acid | 1.0 |
| Aluminum sulfate octadecahydrate | 0.6 |
| Aqueous glycine solution (0.3 M) | 48.2 |
| Aqueous sodium hydroxide solution (6 N) | 1.2 |

The stearic acid was dissolved in the peanut oil by warming to 50° C., while stirring with a magnetic stirring bar, and the resulting solution was poured into a Waring Blendor. The aluminum sulfate octadecahydrate was dissolved in the aqueous glycine solution by stirring at room temperature; the pH of the solution was then adjusted to 7.2 with the aqueous 6 N sodium hydroxide solution, and the resulting suspension was added slowly to the oil phase in the Waring Blendor.

The following table represents the properties of the composition hereinabove prepared:

TABLE 1

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity [1] | 15 seconds. |

[1] Viscosity refers to the time required to expel 0.5 ml. of emulsion from a 5 ml. syringe through a 1″, 20 gauge hypodermic needle using a force of 2 kilograms.

EXAMPLE 2

Utilization of the inventive concept in preparing an adjuvant composition

This example demonstrates the formation of the hydrated reaction products in the aqueous phase prior to emulsification.

A composition consisting of the following ingredients was prepared:

| | Percent by vol. |
|---|---|
| Peanut oil | 50.0 |
| Stearic acid | 0.98 |
| Aluminum sulfate octadecahydrate | 0.57 |
| Deionized water | 46.87 |
| Aqueous sodium hydroxide solution (6 N) | 1.58 |

The aluminum sulfate octadecahydrate was dissolved in one-half of the quantity of the deionized water, and the pH was adjusted to 7.08 with the aqueous sodium hydroxide solution. The stearic acid was then suspended in the remaining quantity of deionized water. The aluminum hydroxide suspension was then added in a dropwise fashion to the stearic acid suspension, and the resulting suspension was added in a dropwise fashion to the peanut oil which had been previously placed in the Waring Blendor.

The following table represents the properties of the composition hereinabove prepared:

TABLE 2

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 7 seconds. |

EXAMPLE 3

Utilization of the hydrated reaction products of the magnesium cation

This example demonstrates a stable adjuvant composition utilizing the hydrated reaction products of a magnesium cation.

A composition consisting of the following ingredients was prepared:

| | Percent by vol. |
|---|---|
| Peanut oil | 48.0 |
| Stearic acid | 2.0 |
| Magnesium chloride hexahydrate | 0.8 |
| Aqueous glycine solution (0.3 M) | 47.4 |
| Aqueous sodium hydroxide solution (6 N) | 1.8 |

The stearic acid was dissolved in peanut oil by warming to 50° C., while stirring with a magnetic stirring bar, and the resulting solution was then poured into a Waring Blendor. The magnesium chloride hexahydrate was dissolved in the aqueous glycine solution and the pH was adjusted to 7.0 with the aqueous sodium hydroxide solution. The resulting suspension was slowly added to the oil phase in the Waring Blendor.

The following table represents the properties of the composition hereinabove prepared:

TABLE 3

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 14 seconds. |

EXAMPLE 4

Utilization of the hydrated reaction products of lauric acid

This example demonstrates a stable adjuvant composition utilizing the hydrated reaction products of lauric acid.

A composition consisting of the following ingredients was prepared:

| | Percent by vol. |
|---|---|
| Peanut oil | 48 |
| Lauric acid | 2.0 |
| Aluminum sulfate octadecahydrate | 1.1 |
| Aqueous glycine solution (0.3 M) | 46.5 |
| Aqueous sodium hydroxide solution (6 N) | 2.4 |

The lauric acid was dissolved in the peanut oil by warming to 50° C., while stirring with a magnetic stirring bar, and the resulting solution was poured into a Waring Blendor. The aluminum sulfate octadecahydrate was dissolved in the aqueous glycine solution by stirring at room temperature, and the pH was adjusted to 7.1 with the aqueous 6 N sodium hydroxide solution. The resulting suspension was then added slowly to the oil phase in the Waring Blendor.

The following table represents the properties of the composition hereinabove prepared:

TABLE 4

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 5.5 seconds. |

EXAMPLE 5

Utilization of the hydrated reaction products of a ceric cation

This example demonstrates a stable adjuvant composition utilizing the hydrated reaction products of a ceric cation.

A composition consisting of the following ingredients was prepared:

| | Percent by vol. |
|---|---|
| Peanut oil | 49 |
| Stearic acid | 1.0 |
| Ceric ammonium sulfate dihydrate, $Ce(SO_4)_2[(NH_4)_2SO_4]_2 \cdot 2H_2O$ | 1.2 |
| Aqueous glycine solution (0.3 M) | 47 |
| Aqueous sodium hydroxide solution (6 N) | 1.8 |

The stearic acid was dissolved in the peanut oil by warming to 50° C., while stirring with a magnetic stirring bar and the resulting solution was poured into a Waring Blendor. The ceric ammonium sulfate dihydrate was then dissolved in the aqueous glycine solution by stirring at room temperature, and the pH was adjusted to 7.2 with the aqueous 6 N sodium hydroxide solution. The resulting suspension was then slowly added to the oil phase in the Waring Blendor.

The following table represents the properties of the composition hereinabove prepared:

TABLE 5

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 7 seconds. |

EXAMPLE 6

Utilization of the inventive concept in preparing an adjuvant composition containing tetanus toxoid in the disperse aqueous phase This example demonstrates a stable adjuvant composition in which the disperse aqueous phase contains tetanus toxoid.

A composition consisting of the following ingredients was prepared:

|  | Percent by vol. |
|---|---|
| Peanut oil | 48.0 |
| Stearic acid | 2.0 |
| Aluminum sulfate octadecahydrate | 1.1 |
| Aqueous glycine solution (0.3 M) containing 43 LF units per ml. of tetanus toxoid | 46.6 |
| Aqueous sodium hydroxide (6 N) | 2.3 |

The stearic acid was dissolved in the peanut oil by warming to 50° C., while stirring with a magnetic stirring bar, and the resulting solution was poured into a Waring Blendor. The aluminum sulfate octadecahydrate was then dissolved in the aqueous glycine solution by stirring at room temperature, and the pH was adjusted to 7.0 with the aqueous 6 N sodium hydroxide solution. The resulting suspension was then slowly added to the oil phase in the Waring Blendor.

The following table represents the properties of the composition hereinabove prepared:

TABLE 6

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 15 seconds. |

EXAMPLE 7

Utilization of the hydrated reaction products of a ferric cation

This example demonstrates a stable adjuvant composition utilizing the hydrated reaction products of a ferric cation.

A composition consisting of the following ingredients was prepared:

|  | Percent by vol. |
|---|---|
| Peanut oil | 48 |
| Stearic acid | 2.0 |
| Ferric chloride hexahydrate | 1.0 |
| Deionized water | 46.4 |
| Aqueous sodium hydroxide (6 N) | 2.6 |

The stearic acid was dissolved in the peanut oil by warming to 50° C., while stirring with a magnetic stirring bar, and the resulting solution was poured into a Waring Blendor. The ferric chloride hexahydrate was then dissolved in the aqueous glycine solution by stirring at room temperature, and the pH was adjusted to 6.8 with the aqueous 6 N sodium hydroxide solution. The resulting suspension was then slowly added to the oil phase in the Waring Blendor.

The following table represents the properties of the composition hereinabove prepared:

TABLE 7

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 9 seconds. |

EXAMPLE 8

Utilization of the hydrated reaction products of oleic acid

This example demonstrates a stable adjuvant composition utilizing the hydrated reaction products of oleic acid.

A composition consisting of the following ingredients was prepared:

|  | Percent by vol. |
|---|---|
| Peanut oil | 48.0 |
| Oleic acid | 2.0 |
| Aluminum sulfate octadecahydrate | 1.1 |
| Aqueous glycine solution (0.3 M) | 46.6 |
| Aqueous sodium hydroxide solution (6 N) | 2.3 |

The oleic acid was dissolved in the peanut oil by warming to 50° C., while stirring with a magnetic stirring bar, and the resulting solution was poured into a Waring Blendor. The aluminum sulfate octadecahydrate was then dissolved in the aqueous glycine solution by stirring at room temperature, and the pH was adjusted to 7.1 with the aqueous 6 N sodium hydroxide solution. The resulting suspension was then slowly added to the oil phase in the Waring Blendor.

The following table represents the properties of the composition hereinabove prepared:

TABLE 8

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 8 seconds. |

EXAMPLE 9

Utilization of the other sources of the metallic cation

This example demonstrates that aluminum chloride hexahydrate can be successfully substituted for aluminum sulfate octadecahydrate.

A composition consisting of the following ingredients was prepared:

|  | Percent by vol. |
|---|---|
| Peanut oil | 49 |
| Stearic acid | 1 |
| Aluminum chloride hexahydrate | 0.3 |
| Aqueous glycine solution (0.3 M) | 48.4 |
| Aqueous sodium hydroxide solution (6 N) | 1.3 |

The stearic acid was dissolved in the peanut oil by warming to 50° C., while stirring with a magnetic stirring bar, and the resulting solution was poured into a Waring Blendor. The aluminum chloride hexahydrate was then dissolved in the aqueous glycine solution by stirring at room temperature, and the pH was adjusted to 7.3 with the aqueous 6 N sodium hydroxide solution. The resulting suspension was then slowly added to the oil phase in the Waring Blendor.

The following table represents the properties of the composition hereinabove prepared:

TABLE 9

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 12.5 seconds. |

EXAMPLE 10

Utilization of the inventive concept in preparing an adjuvant composition

This example demonstrates a stable adjuvant composition in which the aqueous phase is phosphate-buffered saline.

A composition consisting of the following ingredients was prepared:

|  | Percent by vol. |
|---|---|
| Peanut oil | 49 |
| Stearic acid | 1.0 |
| Aluminum sulfate octadecahydrate | 0.5 |
| Phosphate-buffered saline | 47.3 |
| Aqueous sodium hydroxide solution (6 N) | 2.2 |

The stearic acid was dissolved in the peanut oil by warming to 50° C., while stirring with a magnetic stirring bar, and the resulting solution was poured into a Waring Blendor. The aluminum sulfate octadecahydrate was then dissolved in the phosphate-buffered saline by stirring at room temperature, and the pH was adjusted to 7.0 with the aqueous 6 N sodium hydroxide solution. The resulting suspension was then slowly added to the oil phase in the Waring Blendor.

The following table represents the properties of the composition hereinabove prepared:

TABLE 10

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 15.5 seconds. |

EXAMPLE 11

Utilization of the inventive concept in preparing an adjuvant composition

This example demonstrates a stable adjuvant composition in which the continuous oil phase is soya bean oil.

A composition consisting of the following ingredients was prepared:

| | Percent by vol. |
|---|---|
| Soya bean oil | 48 |
| Stearic acid | 2.0 |
| Aluminum sulfate octadecahydrate | 1.1 |
| Aqueous glycine solution (0.3 M) | 46.4 |
| Aqueous sodium hydroxide solution (6 N) | 2.5 |

The stearic acid was dissolved in the soya bean oil by warming to 50° C., while stirring with a magnetic stirring bar, and the resulting solution was poured into a Waring Blendor. The aluminum sulfate octadecahydrate was then dissolved in the aqueous glycine solution by stirring at room temperature, and the pH was adjusted to 7.0 with the aqueous 6 N sodium hydroxide solution. The resulting suspension was then slowly added to the oil phase in the Waring Blendor.

The following table represents the properties of the composition hereinabove prepared:

TABLE 11

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 9.5 seconds. |

EXAMPLE 12

Utilization of other sources of a metallic cation

This example demonstrates the use of alum gel to provide the metallic cation of the adjuvant composition of the present invention.

A composition consisting of the following ingredients were prepared:

| | Percent by vol. |
|---|---|
| Peanut oil | 49 |
| Stearic acid | 1 |
| Glycine | 1.1 |
| Suspension containing 0.46 gram of alum gel per 100 ml. (prepared by neutralizing potassium aluminum sulfate to pH 7 with sodium hydroxide and washing the precipitate with deionized water until free from sulfate ion) | 48.8 |
| Aqueous sodium hydroxide solution (6 N) | 0.1 |

The stearic acid was dissolved in the peanut oil by warming to 50° C., while stirring with a magnetic stirring bar, and the resulting solution was poured into a Waring Blendor. The glycine was added to the alum gel suspension and the pH was adjusted to 7.0 with the aqueous 6 N sodium hydroxide solution. The resulting suspension was then slowly added to the oil phase in the Waring Blendor.

The following table represents the properties of the composition hereinabove prepared:

TABLE 12

| | |
|---|---|
| Stable droplets in water at room temperature | Yes. |
| Electrical conductivity | Negative. |
| Percent aqueous phase produced at 1,780 r.p.m. for 45 minutes | 0. |
| Viscosity | 4 seconds. |

EXAMPLE 13

Multiple emulsion

This example demonstrates the formation of a bimultiple emulsion as described by Seifriz, Journal of Physical Chemistry, volume 29, page 738 (1925). Furthermore, the example demonstrates that the novel adjuvant composition of the present invention may be emulsified in an aqueous media without destruction of the original water-in-oil emulsion, resulting in the formation of the bimultiple water-in-oil-in-water emulsion.

A composition consisting of the following ingredients was prepared:

| | Percent by vol. |
|---|---|
| Emulsion of Example 1 | 15 |
| Tween 80 | 1 |
| Phosphate-buffered saline | 84 |

The Tween 80 was dissolved in the phosphate-buffered saline by stirring at room temperature with a magnetic stirring bar. The composition prepared in the manner set forth in Example 1 was then added to the saline solution and the probe of an ultrasonic generator was inserted to a depth of 5 mm. in the mixture. The mixture was ultrasonically agitated for 5 seconds, repeating the agitation for a total of four times.

A multiple water-in-oil-in-water emulsion was formed. The formation of said multiple water-in-oil-in-water emulsion was confirmed by phase contrast and interference microscopy.

EXAMPLE 14

Utilization of non-hydrated reaction products

This example demonstrates that the utilization of a non-hydrated reaction product of a physiologically acceptable polyvalent metallic cation and a physiologically acceptable fatty acid containing 12 to 24 carbon atoms, fails to achieve a stable adjuvant composition.

A composition consisting of the following ingredients was prepared:

| | Percent by vol. |
|---|---|
| Aluminum monostearate | 2 |
| Peanut oil | 48 |
| Aqueous glycine solution (0.3 M) | 50 |

The aluminum monostearate was slowly added with stirring to the peanut oil, and the homogeneous mixture was then added slowly, with stirring to about 120° C. to insure thorough dispersion of the aluminum monostearate in the oil. The homogeneous mixture was then permitted to cool to room temperature (20–30° C.). The aqueous phase was then incorporated slowly into the mixture with stirring, using a variable speed mechanical stirring device to form the emulsion. Subsequent to the addition of the aqueous phase, stirring was conducted for 2 more minutes at the same speed used during the addition of the aqueous phase, to insure complete emulsification. At the end of the period, 10 percent of the aqueous phase had separated from the emulsion as a clear lower layer. Therefore, the composition is totally unsuitable as an adjuvant composition.

Although the invention has been described and illustrated by reference to particular embodiments thereof, it will be understood that in its broadest aspects the invention is not limited to such embodiments, and that varia-

What is claimed is:

1. In an adjuvant composition comprising an emulsion with a dispersed aqueous phase containing an antigenic substance and a continuous oil phase, the improvement which comprises an emulsifying agent consisting essentially of an admixture of at least 0.15% by volume of hydrated salts of physiologically acceptable polyvalent metallic cations and physiologically acceptable fatty acids having 12 to 24 carbon atoms.

2. A composition according to claim 1, in which the polyvalent metallic cation is aluminum and the physiologically acceptable fatty acid is stearic acid, in a molar ratio of aluminum to stearic acid of 1:2.

3. A composition according to claim 1, in which the continuous oil phase is peanut oil.

4. A composition according to claim 1, in which the continuous oil phase is soya bean oil.

5. A bimultiple emulsion adjuvant composition comprising a continuous aqueous phase containing a dispersed oil phase, said dispersed oil phase consisting of a water-in-oil emulsion of claim 1.

6. A composition according to claim 5, in which the continuous oil phase is peanut oil.

7. A composition according to claim 5, in which the continuous oil phase is soya bean oil.

References Cited

FOREIGN PATENTS 929,403    6/1963    Great Britain.

OTHER REFERENCES

Woodhour et al.: Society for Experimental Biology and Medicine, Proceedings, vol. 116, No. 2, pp. 516—523, June 1965.

ELBERT L. ROBERTS, *Primary Examiner.*

R. HUFF, *Assistant Examiner.*